US007110533B2

(12) United States Patent
Cooke

(10) Patent No.: US 7,110,533 B2
(45) Date of Patent: Sep. 19, 2006

(54) TELEPHONE NID ISOLATION MODULE

(75) Inventor: Mark Cooke, Shawonee, KS (US)

(73) Assignee: Time Warner Cable, Inc., Stamford, CT (US)

( * ) Notice: Subject to any disclaimer, the term of this patent is extended or adjusted under 35 U.S.C. 154(b) by 171 days.

(21) Appl. No.: 10/848,294

(22) Filed: May 18, 2004

(65) Prior Publication Data

US 2005/0259810 A1 Nov. 24, 2005

(51) Int. Cl.
*H04M 9/00* (2006.01)

(52) U.S. Cl. ................................................ 379/413.04

(58) Field of Classification Search ............ 379/413.04
See application file for complete search history.

(56) References Cited

U.S. PATENT DOCUMENTS 5,305,380 A * 4/1994 Hileman et al. ............ 379/445
5,964,614 A * 10/1999 Daoud ........................ 439/417

* cited by examiner

*Primary Examiner*—Curtis Kuntz
*Assistant Examiner*—Alexander Jamal
(74) *Attorney, Agent, or Firm*—Roberts Mardula & Werthelm, LLC

(57) ABSTRACT

A telephone network interface device (NID) isolation module (NIM). The NIM is adapted to fit a telco-side modular jack of a NID bridging a telco feed to inside wiring. The NIM comprises a modular plug made of an electrically insulating material that fits securely in the modular jack. Following disconnection of the telco feed from the inside wiring, the NIM is inserted into the modular jack to prevent the reconnection of the telco feed to the inside wiring. A tag component of the NIM is used to provide instructions and warnings to a subscriber or a service technician relating to the use of the telco-side modular jack.

7 Claims, 2 Drawing Sheets

TELEPHONE NID ISOLATION MODULE

BACKGROUND

The present invention relates to electrical connectors and more particularly to modular jacks used in residential telephone systems.

Telephone companies (or "telcos") typically maintain telephone wiring up to a demarcation point where the telco feed interfaces with the house or premises wiring. The demarcation point is located in a network interface device (NID). The NID has two "sides"—one for the phone company and one for subscriber access. At least the telco-side of the NID terminates in a modular jack. To connect the inside wiring to the telco feed, a jumper cable terminated with a modular plug is plugged into the modular jack. The other end of the jumper is either hardwired to the subscriber-side or is plugged into a modular jack connect to the subscriber-side. This arrangement allows the telco feed and the inside wiring to be isolated for troubleshooting and maintenance.

Competition for local telephone service subscribers is growing. Broadband service providers offer digital telephone service, which turns voice calls into digital packets for dispatch over an IP network. A cable company can now offer cable TV, telephone service and broadband connections on one bill to its subscribers.

When a cable subscriber elects to convert from telco-provided local phone service to cable-provided local service, the inside wiring is connected through a cable voice interface device to the cable provider's network. Typically, a cable modem is connected to a media terminal adapter (MTA) that is connected to the inside wiring through a wall jack. To isolate the cable equipment from the telco feed, the telco feed is disconnected from the inside wiring at the demarcation point. Where a NID has been provided, this requires removal of the jumper connecting the telco side of the NID to the subscriber-side of the NID be removed.

The modular plug/modular jack arrangement makes this a simple task. However, the risk to the cable operator and to the telco is that at some point in the future, the subscriber or a service technician may reconnect jumper using at now-empty modular jack. Cable voice interface devices may be then be exposed to potentially damaging signals from the telco feed. Similarly, signals from the MTA may risk damage to telco equipment at the central office. One solution to this problem is to remove the inside wiring from the NID and provide a new cross connect from the inside wiring to the cable voice interface. However, this adds labor and equipment cost to the installation of the cable voice service.

What is needed is an inexpensive means for preventing the reconnection of inside wiring to a telco feed at a NID in a cable voice installation.

SUMMARY

An embodiment of the present invention is a telephone NID isolation module (NIM) adapted to fit a telco-side modular jack of a NID bridging a telco feed to inside wiring. The NIM comprises a modular plug made of an electrically insulating material that fits securely in the modular jack. Following disconnection of the telco feed from the inside wiring, the NIM is inserted into the modular jack to prevent the reconnection of the telco feed to the inside wiring. Where a NID comprises two modular jacks and a removable jumper, a NIM is inserted in the modular jack connected to the telco-side of the NID. In another embodiment of the present invention, the NIM further comprises a tag for providing instructions and warnings to a subscriber owner or a service technician relating to the use of the telco-side modular jack.

It is therefore an aspect of the present invention to prevent the use of a telco-side modular jack of a telephone NID in a cable telephone service installation.

It is another aspect of the present invention to prevent damage to cable and telco equipment through reconnection of a telco feed to the inside wiring in a cable telephone service installation.

It is yet another aspect of the present invention to reduce the cost of installation and maintenance of cable telephone service by eliminating the need to remove inside wiring from a telephone NID.

In an embodiment of the present invention, a telephone network interface isolation module is provided. The telephone network interface isolation module comprises a modular plug adapted to fit a standard RJ-type jack, a strap having first and second end portions wherein the first end portion is secured to the modular plug, and means for securing the second end portion of the strap to a message tab. In one embodiment, the modular plug is an RJ-11 modular plug. Optionally, the modular plug comprises a crimping tab and the strap is secured to the modular plug using the crimping tab. Additionally, the message tab is adapted to receive a warning label.

In still another embodiment of the present invention, a method of protecting cable telephone service equipment in a cable telephone service installation is provided. A telephone network interface device (NID) is located. A telephone company feed is disconnected from an inside wiring system by removing a modular plug connected to the inside wiring system from a modular jack connected to the telephone company feed. A telephone network interface isolation module as previously described is then installed, either removably or permanently. Instructions to telephone company service personnel are provided.

These and other aspects of the present invention will become apparent from a review of the general and detailed descriptions that follow.

DETAILED DESCRIPTION

An embodiment of the present invention is a telephone NID isolation module (NIM) adapted to fit a modular jack of a NID bridging a telco feed to inside wiring. The NIM comprises a modular plug made of an electrically insulating material that fits securely in the modular jack. Following disconnection of the telco feed from the inside wiring, the NIM is inserted into the modular jack to prevent the reconnection of the telco feed to the inside wiring. Where a NID comprises two modular jacks and a removable jumper, a NIM is inserted in the modular jack connected to the telco-side of the NID. In another embodiment of the present invention, the NIM further comprises a tag for providing instructions and warnings to the residence owner or service technician relating to the use of the telco-side modular jack.

Figure 1:
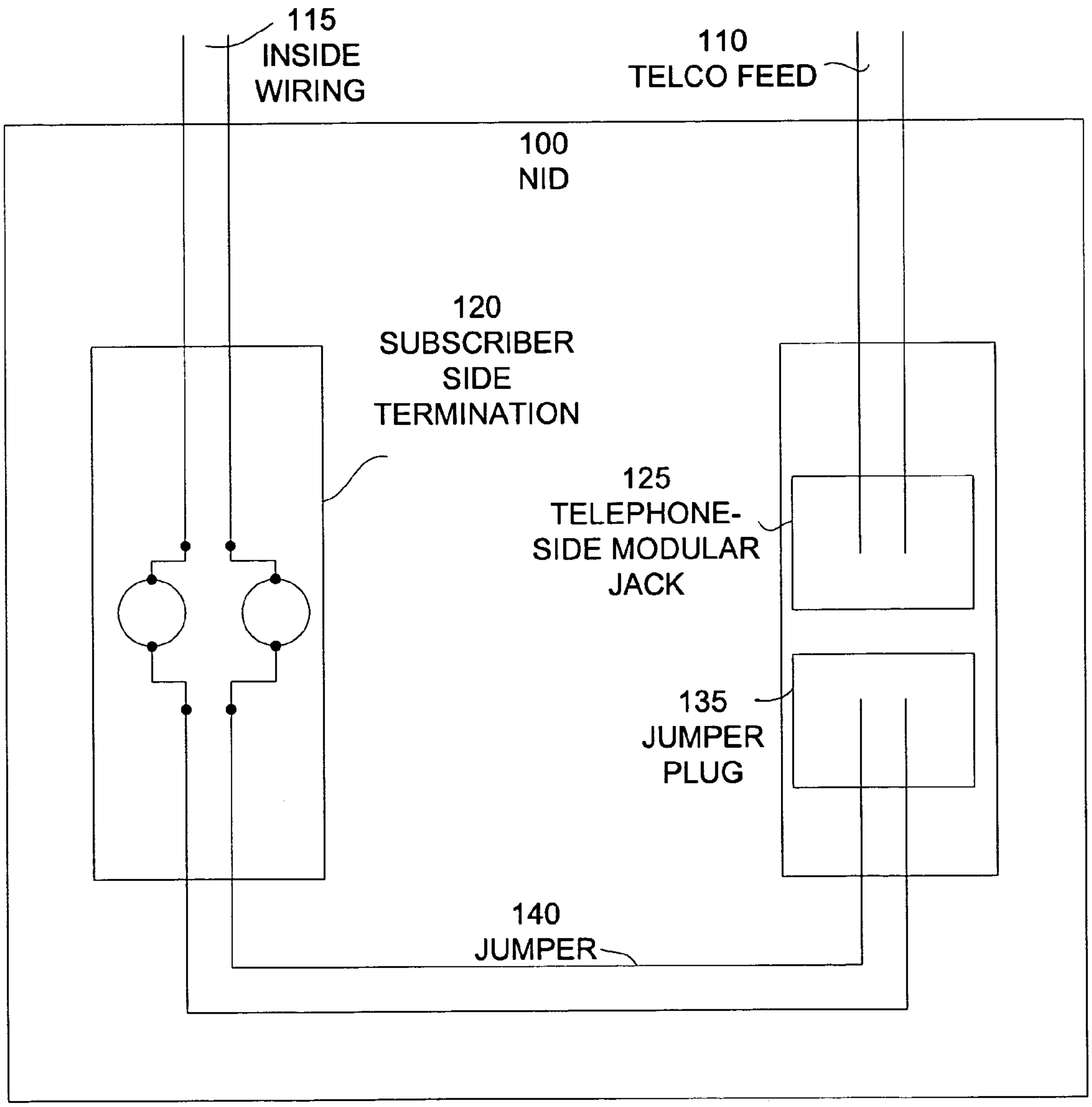
FIGURE 1 PRIOR ART
FIG. 1 illustrates a telephone network interface device (NID) according to the prior art.

FIG. 1 illustrates a block diagram of a telephone NID according to the prior art. Referring to FIG. 1, a NID 100 comprises a subscriber-side termination 120 where inside wiring 115 is connected to a jumper 140. While the connection between the inside wiring 115 is connected to a jumper 140 is illustrated as a hardwired connection, other means of connection are possible. A telephone-side modular jack 125 is connected to inside wiring 115 of a residence. The telephone-side modular jack 125 is adapted to receive modular jumper plug 135. When modular jumper plug 135 is inserted into the telephone-side modular jack 125, the telco feed 110 is connected to the inside wiring.

In yet another embodiment of the present invention, the NIM is adapted to fit a modular jack described in FCC rules specified at 47 C.F.R Part 68, Subpart F for 4/6 conductors connectors. In the art, these jacks are referred to as "RJ-11" jacks. The RJ-names stand for Registered Jack and are USOC (Universal Service Ordering Codes) codes and originate from the Bell system. USOC are a series of Registered Jack wiring configurations developed by the Bell System for connection of customer premise equipment to the public network. FCC regulations control the application of these configurations when used for this purpose. As will be appreciated by those skilled in the art, the NIM may be adapted to fit other modular jacks without departing from the scope of the present invention. By way of illustration and not as a limitation, a NIM may be adapted to fit an RJ-45 jack.

Figure 2A:
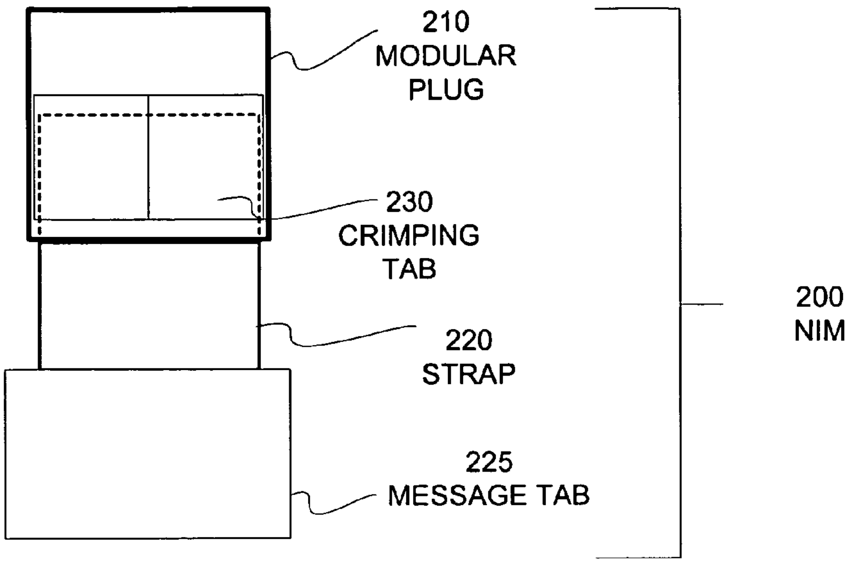
FIG. 2A illustrates a telephone NID isolation module according to embodiments of the present invention.

FIG. 2A illustrates a telephone NID isolation module (NIM) according to embodiments of the present invention. NIM 200 comprises a modular plug 210 made of an insulating material. In an embodiment of the present invention, the modular plug 210 is molded plastic and comprises locking tab 215 (illustrated in FIG. 2B). In this embodiment, modular plug 210 and locking tab 215 conform to the physical requirements established for an RJ-11 modular jack. As will be apparent to those skilled in the art, a modular plug may be sized to fit modular jacks of "RJ" specifications without departing from the scope of the present invention. Module plug 210 further comprises crimping tab 230.

Figure 2C:
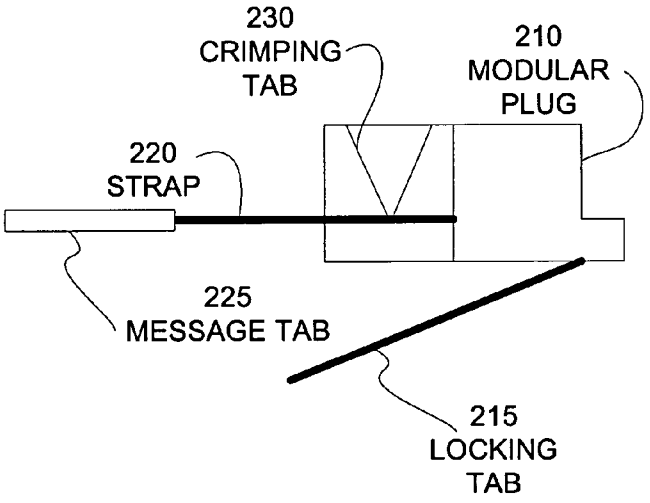
FIG. 2C illustrates a side view of a telephone NID isolation module according to embodiments of the present invention.
Figure 2B:
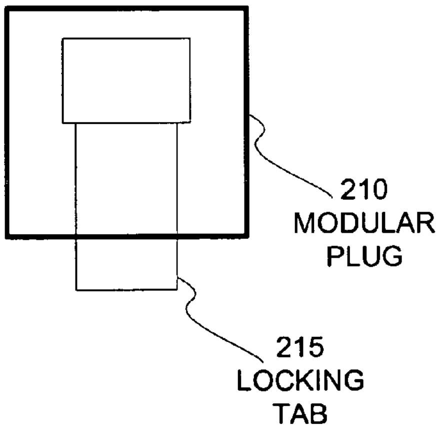
FIGURE 2B (PRIOR ART)
FIG. 2B illustrates a view of a modular phone plug according to the prior art.

Referring to FIG. 2C, modular plug 210 is attached to strap 220 by crimping tab 225 by means known in the art. Strap 220 is connected to message tab 225. Strap 220 is flexible and allows the NIM 200 to be installed in a variety of environments where space is limited. Message tab 225 comprises a front and back surface (not illustrated) that may receive a text message comprising instructions and/or warnings relating to the reconnection of the inside wiring to the telco feed. In an embodiment of the present invention, the message tab 225 is plastic and text message is formed in the plastic during manufacture. In an alternate embodiment, the text message is formed on a label that is attached to the one or both surfaces of the message tab.

In an embodiment of the present invention, a NIM is used to protect equipment installed to support cable-provided telephone service and to protect telco equipment. When a cable subscriber elects to convert from telco-provided telephone phone service to cable-provided telephone service, the inside telephone wiring is connected to a media terminal adapter (MTA) at a wall jack. The MTA is connected to a cable modem that connected to the cable provider's network. To isolate the cable equipment from the telco feed, the telco feed is disconnected from the inside wiring at the demarcation point by removing the module plug from the telephone-side modular jack on the NID. To protect the MTA and cable modem from interference and damage from signals on the telco feed, a NIM is installed in the telephone-side modular jack on the NID. A text message is incorporated on the message tab warning against the removal of the NIM.

A NID isolation module has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. A method of protecting cable telephone service equipment in a cable telephone service installation comprising:

locating a telephone network interface device (NID);

disconnecting a telephone company feed from an inside wiring system by removing a modular plug connected to the inside wiring system from a modular jack connected to the telephone company feed; and installing a telephone network interface isolation module, wherein the network interface isolation module comprises:

a modular plug adapted to fit a standard RJ-type jack:

a strap having first and second end portions wherein the first end portion is secured to the modular plug via a crimping tab; and means for securing the second end portion of the strap to a message tab.

2. The method of protecting cable telephone service equipment in a cable telephone service installation of claim 1, wherein installing a telephone network interface isolation module comprises installing a telephone network interface isolation module so that the telephone network interface isolation module is removably installed.

3. The method of protecting cable telephone service equipment in a cable telephone service installation of claim 1, wherein installing a telephone network interface isolation module comprises installing a telephone network interface isolation module so that the telephone network interface isolation module is permanently installed.

4. The method of protecting cable telephone service equipment in a cable telephone service installation of claim 1, wherein the message tab comprises instructions to telephone company service personnel.

5. The method of protecting cable telephone service equipment in a cable telephone service installation of claim 1, wherein the modular plug comprises a crimping tab and the strap is secured to the modular plug using the crimping tab.

6. The method of protecting cable telephone service equipment in a cable telephone service installation of claim 1, wherein the message tab is adapted to receive a warning label.

7. The method of protecting cable telephone service equipment in a cable telephone service installation of claim 1, wherein the modular plug is an RJ-11 modular plug.

* * * * *